(12) United States Patent
Yadav et al.

(10) Patent No.: US 10,719,413 B2
(45) Date of Patent: Jul. 21, 2020

(54) UNIFIED RCT BACKUP FOR DIFFERENT HYPERVISOR CONFIGURATIONS

(71) Applicant: EMC IP Holding Company LLC, Hopkinton, MA (US)

(72) Inventors: Sunil Yadav, Bangalore (IN); Aaditya R. Bansal, Bathinda (IN); Soumen Acharya, Bangalore (IN); Suman C. Tokuri, Bangalore (IN); Sudha V. Hebsur, Bangalore (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 165 days.

(21) Appl. No.: 15/955,639

(22) Filed: Apr. 17, 2018

(65) Prior Publication Data

US 2019/0317867 A1   Oct. 17, 2019

(51) Int. Cl.
*G06F 11/14* (2006.01)
*G06F 11/07* (2006.01)
*G06F 9/455* (2018.01)

(52) U.S. Cl.
CPC ...... *G06F 11/1471* (2013.01); *G06F 9/45558* (2013.01); *G06F 11/0709* (2013.01); *G06F 11/0712* (2013.01); *G06F 11/1407* (2013.01); *G06F 11/1451* (2013.01); *G06F 11/1469* (2013.01); *G06F 2201/80* (2013.01); *G06F 2201/815* (2013.01); *G06F 2201/84* (2013.01)

(58) Field of Classification Search
CPC ............. G06F 9/45558; G06F 11/0709; G06F 11/0712; G06F 11/1407; G06F 11/1451; G06F 11/1469; G06F 11/1471; G06F 2201/80; G06F 2201/815; G06F 2201/84; G06F 11/1448; G06F 11/1458
See application file for complete search history.

(56) References Cited

U.S. PATENT DOCUMENTS

| | | | |
|---|---|---|---|
| 9,128,627 B1 * | 9/2015 | Bachu | G06F 11/1456 |
| 9,424,137 B1 * | 8/2016 | Mam | G06F 11/1451 |
| 9,720,783 B1 * | 8/2017 | Kulkarni | G06F 11/1461 |
| 2012/0255017 A1 * | 10/2012 | Sallam | G06F 21/575 726/24 |

* cited by examiner

*Primary Examiner* — Larry T MacKall
(74) *Attorney, Agent, or Firm* — Barry N. Young

(57) ABSTRACT

A unified backup workflow process for different hypervisor configurations of virtual machines on different storage of a cluster leverages RCT-based backup functionality so that backup operations can be performed by a single host of the cluster. The process enables backing up together virtual machines that are local, as well as part of CSV or SMB storage using virtual machine level snapshots as checkpoints rather than volume level snapshots that were traditionally used. Backup data is sent to a backup server as a data stream rather than a file, which avoids the necessity of maintaining chains or structures that identify parent-child disks on the server.

20 Claims, 2 Drawing Sheets

UNIFIED RCT BACKUP FOR DIFFERENT HYPERVISOR CONFIGURATIONS

BACKGROUND

This invention relates generally to the backup and recovery of virtual machines in a Windows environment, and more particularly to a single unified framework for backing up virtual machines in different configurations and in different environments.

Traditional approaches to Windows hypervisor backups employed volume shadow copy service (VSS) for incremental backups. During a full backup, a VSS snapshot was taken of the volume on which the target virtual machine resides to freeze the virtual machine's state. Once the snapshot was taken, a recovery snapshot and a differencing disk were created for the target virtual machine. The virtual machine was then run on the recovery snapshot, and all writes would be directed to the new differencing disk.

This and other traditional approaches to backup of virtual machines were heavily dependent on the underlying system design. Windows hypervisors provided the user with various configurations to store and use virtual machines. These included a stand-alone local storage-based host; a failover cluster with various hosts having common cluster shared volumes (CSVs); a standalone or failover cluster with an SMB share to store and use virtual machines; or a mix of the foregoing. To handle the various configurations, different writers, different providers, etc. were required, which resulted in different backup architectures and solutions for different configurations. Most approaches also required the active participation from all hosts in the case of a cluster. This resulted in numerous issues. One issue was reliability. The VSS writers were not very reliable and large environments, leading to backup failures, and the virtual machines ran on differencing disks all the time which impacted overall performance. Another issue was scalability. Because the VSS writers on the host were involved in the backups, parallel backups could not be performed, thus leading to serialized backups. Moreover, because the VSS snapshots were taken at the volume level, even if only a single virtual machine was backed up all the virtual machines on the volume were impacted. Additionally, the virtual machines running on differencing disks led to space overhead. A further issue was performance. Backup agents had to be installed on every host because the VSS backup writers were involved, which adversely impacted availability; a lot of data had to be copied; and it took a long time to create volume level snapshots.

To address some of these issues, resilient change tracking (RCT), which is a native Microsoft change block tracker (CBT), was introduced in Windows Server 2016. It made incremental backups faster and easier without the necessity of writing and maintaining different CBT mechanisms by creating for every virtual hard disk files that tracked the changed blocks for each virtual hard disk chain. Instead of having to backup an entire virtual hard disk file, or having to traverse the whole file in order to obtain at the changed blocks, the backup software could query the files and get a list of blocks that had changed and backup only the changed blocks during incremental backups.

While RCT addressed some of the issues with VSS, it did not address all of them. For instance, different workflows were still required for different hypervisor configurations. For example, virtual machines stored on a CSV volume and on a SMB share on the same host cannot be backed up using the same configuration. This required the involvement of their hosts.

It is desirable to provide methods and systems for backing up virtual machines in different hypervisor configurations that address the foregoing and other problems of known backup approaches. In particular, it is desirable to provide a unified backup approach for virtual machines in a user environment that enables machines that are local as well as those that are highly available (CSV and SMB) to be backed up, and that effectively performs load-balancing without requiring the active participation of all the hosts in the user environment. It is to these ends that the present invention is directed.

DESCRIPTION OF PREFERRED EMBODIMENTS

As will be described, the invention provides a system and method employing a single unified framework process for backing up virtual machines in any of a variety of different configurations and environments by adapting the capabilities and functions of many of the windows-based RCT capabilities for use in a novel sequence of operations comprising the inventive framework. This is done in a manner that insures that a majority of the operations can be performed from a single host of a hypervisor cluster so as not to unduly hinder the availability of other hosts of the cluster, and without requiring different workflows for different configurations.

A workflow process in accordance with the invention can be used to back up machines that are local as well as part of a highly available CSV or SMB group. The workflow process effectively performs load-balancing without requiring the active participation of all of the hosts in the user environment. Furthermore, a majority of the operations can be performed from a single host in the user environment, which results in a number of performance and availability advantages.

In essence, the invention comprises formulating a new unified backup and recovery process comprising a sequence of operations which leverages capabilities of RCT functionality to expand the backup and recovery process to handle virtual machine targets in different environments and on different types of storage. One key factor contributing to this includes affording one configuration that is capable of backing up all virtual machines residing on different storage such as CSV and SMB. Another key factor comprises creating snapshots that are limited to each virtual machine, rather than requiring volume level snapshots as is done in traditional configurations. This affords faster snapshots and frees up resources on other hosts for other operations. A further key factor is the data is sent to the remote backup server not as a file, but as a data stream. This obviates the need to maintain any chains or structures identifying parent-child disks on the server.

Figure 1:
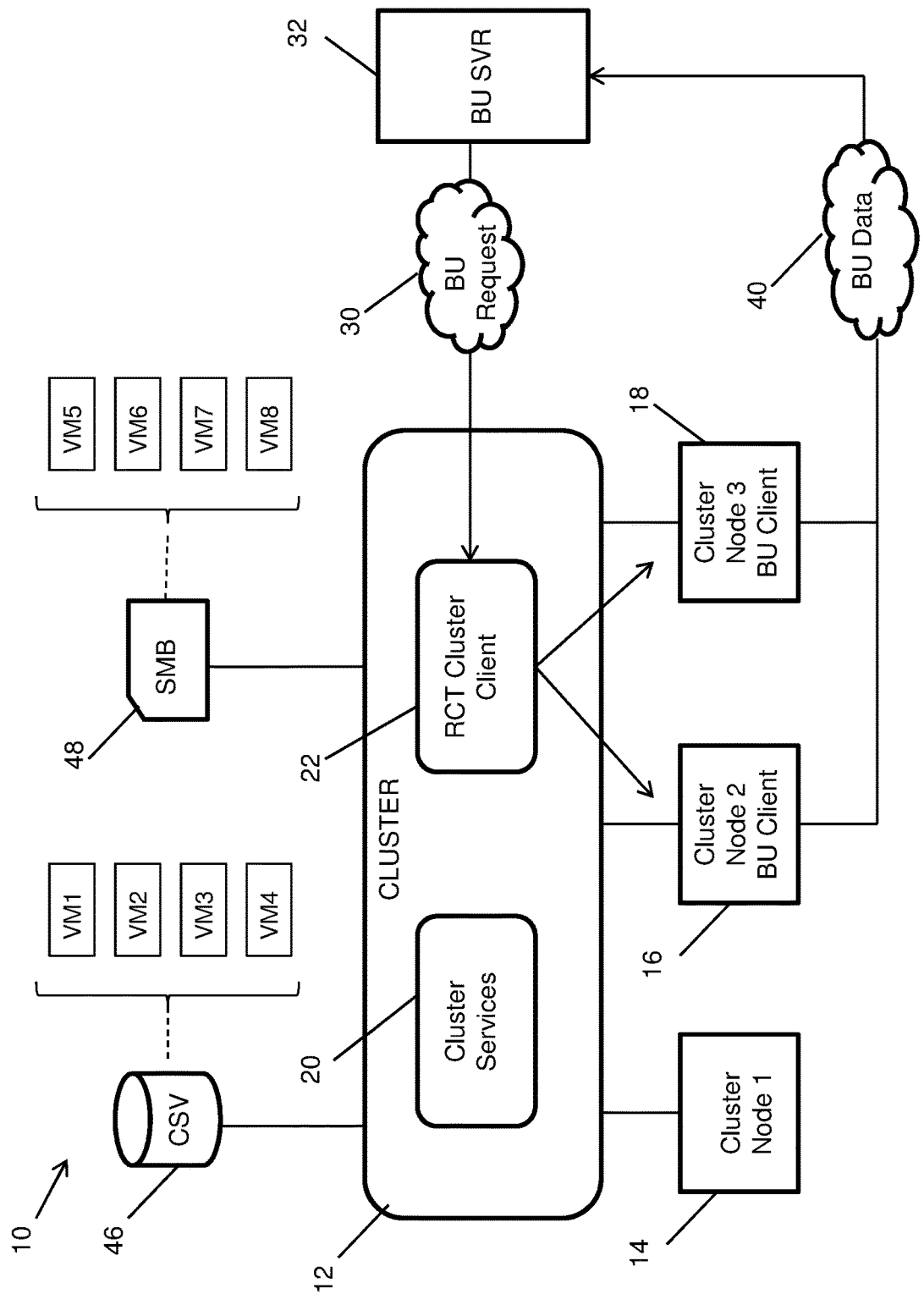
FIG. 1 is diagrammatic block diagram illustrating an RCT cluster system of the type in which the invention may be used.

FIG. 1 is diagrammatic block diagram illustrating an RCT cluster system 10 of the type in which the invention may be used. As shown, system 10 may comprise a cluster 12 supporting three cluster nodes (hosts), cluster node 1, (14), cluster node 2, (16) and cluster node 3 (18). Each node may comprise (not shown in the figure) a processor/host, a memory for storing executable instructions for controlling the processor/host, and local storage. Cluster 12 may also have one or more servers (not shown) and shared storage, and be configured to provide cluster services 20 and to provide an RCT cluster client 22. The RCT cluster client may receive backup requests 30 from a backup server 32, and communicate with cluster nodes, such as cluster node 2 (16) and cluster node 3 (18), to provide backup data 40 to the backup server 32. In an embodiment, the backup server 32 may be an Avamar server system of Dell/EMC, the assignee of the present invention, which includes a processor providing source-based data deduplication, running backup software for backing up of data from cluster nodes, and managing backup storage for storing the backed up data. All three cluster nodes may incorporate Hyper-V functionality. Cluster nodes 2 (16) and 3 (18) may be proxy nodes that have a Hyper-V plug-in that creates new virtual machine groups and adds target virtual machines to the groups. The Hyper-V plug-in may also create a recovery checkpoint for virtual machine groups, as will be described. Cluster nodes 2 and 3 also may serve as Avamar clients for the Avamar backup server 32. RCT cluster client 22 may communicate to cluster nodes 2 and 3 backup requests 30 received from the backup server 32, and cause cluster nodes 2 and 3, to respond to the requests as backup clients by forwarding data 40 to the backup server for backup.

As shown in FIG. 1, cluster system 10 may have shared storage comprising cluster shared volumes (CSV) 46 and server message block (SMB) file share storage 48 for respective pluralities of virtual machines VM1-VM4 and VM5-VM8. In response to a backup request 30 from backup server 32, the cluster nodes 2 and 3 provide virtual machine data from CSV 46 and SMB 48 to the backup server. Underlying storage has no role in the creation of different backup configurations, and a unified backup process in accordance with the invention, as will be described, can back up all virtual machines in one single configuration irrespective of the virtual machine storage. Moreover, because there is no involvement of Microsoft writers and providers, the limitations imposed by such writers and producers in traditional backup approaches are avoided.

Figure 2:
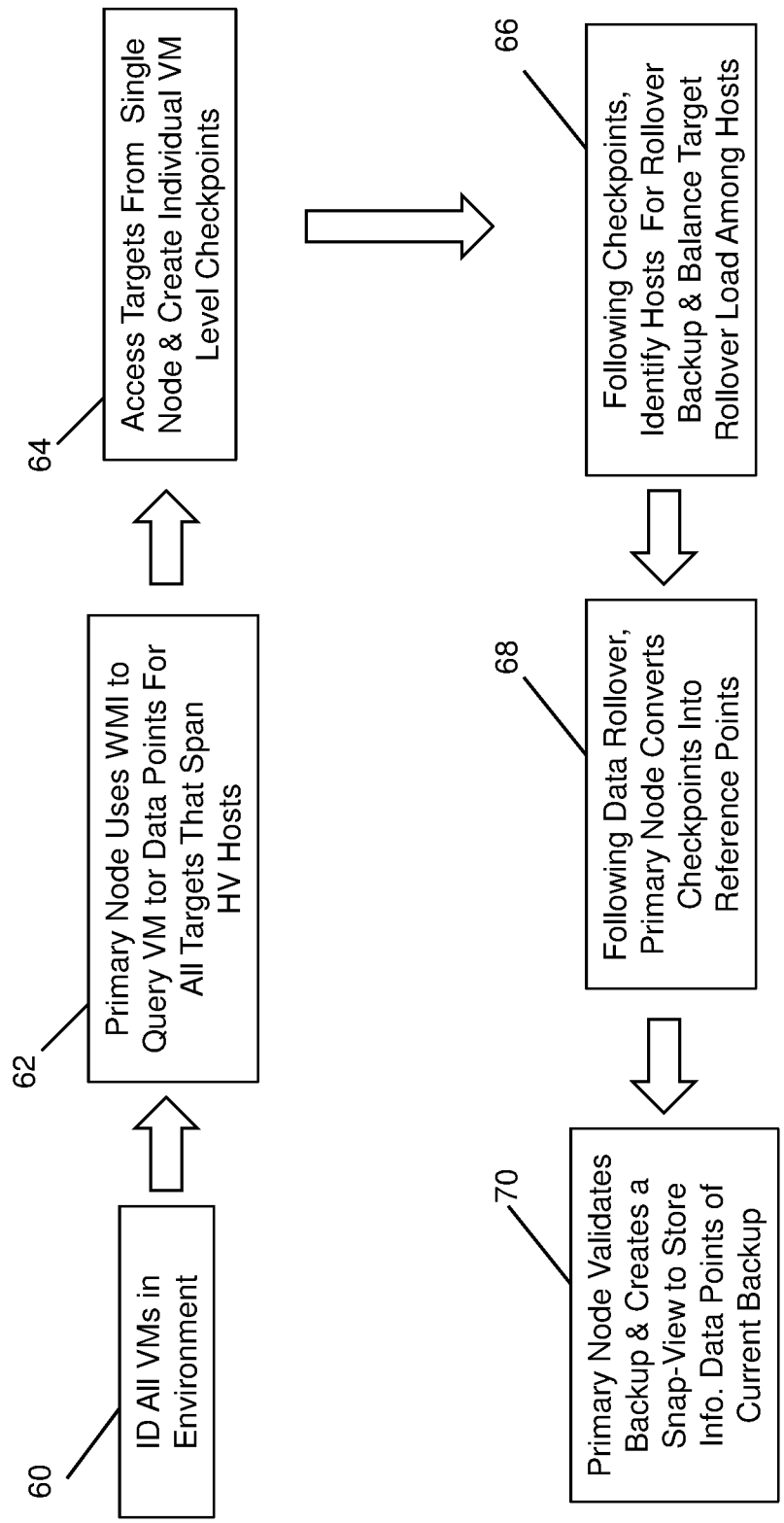
FIG. 2 is a unified resilient change tracking (RCT) process in accordance with the invention.

FIG. 2 is a functional block diagram illustrating an embodiment of a unified backup process in accordance with the invention. The process may be run on a single host (primary node) or selected hosts of a configuration, such as the cluster 10 of FIG. 1. Referring to FIG. 2, the process begins at 60 by identifying all virtual machine targets in the environment. For the cluster of FIG. 1, this may include all virtual machines VM1-VM8 in the cluster irrespective of whether the virtual machines are based upon a CSV or an SMB share. After selection of the target virtual machines for backup, as by a user, the properties of the target virtual machines are gathered at 62 from the cluster hosts as well as from the remote server to check already backed up data. Information gathered from the remote server provides information pertaining to any backup of the target virtual machine that is present on the server. The target machine virtual properties are preferably gathered by only one host, a primary node, which collects the information by issuing queries, such as the WMI (Windows Management Instrumentation) queries, to access the virtual machine data points for all virtual machine targets. The targets may span over numerous hosts in a cluster, and the targets may be segregated into full or incremental backup targets.

Once the process of collecting virtual machine data points for all targets has been completed, at 64 the process for checkpointing the targets is performed from a single host. This may be done by using Windows APIs to obtain virtual machine-level snapshots for the target virtual machines, which is in contrast to traditional approaches that required volume level snapshots. Obtaining virtual machine-level snapshots as checkpoints for virtual machine targets, rather than volume level snapshots, substantially reduces the downtime for the targets since individual virtual machines are occupied for only a fraction of the time required for volume level snapshots that necessitated the entire target set to be occupied for the duration of the checkpointing operation.

Once checkpoints have been obtained, at 66 hosts are identified for a backup rollover process, and the entire load of the targets' rollover is balanced among the identified hosts. The identified hosts (proxy hosts) act as open points from where the rollover process for the corresponding targets is initiated. For a full backup, the underlying disks are sent over to the backup server as a data stream. For an incremental backup, the data from the last backup of the target (RCT ID) that identifies extents (location, offset and length) of the chunks of data which may have changed since the last backup may be sent to the remote server. The corresponding locations where the data would be written (merged on top of backup data already present) is identified, and the changed data may be streamed to the remote server where it may be merged into a single disc with the already present data.

Once the rollover data process is complete on all nodes, at 68 the primary node may convert a checkpoint created at 66 into a reference point. This may be done using the initially created snapshot and a RCT ID which is created to track subsequent changes to the target following backup. The reference point is required to track changes following the backup process so that the next backup only backs up incremental data changes of the targets.

After the successful creation of a checkpoint at 68, the primary node at 70 validates the backup and creates a snap-view comprising metadata to store various information data points and properties of the targets and the current backup process. This metadata enables access to the last backup information of a target, and may be used while performing recovery from the backup as well as performing the next incremental backup of the target.

As may be appreciated from the foregoing, a unified backup and recovery process in accordance with the invention which leverages RCT functionality and simplifies and enhances the backup and recovery process and affords a number of advantages over traditional backup and recovery processes. In particular, it permits one configuration to backup all the virtual machines residing on different storage in a virtual machine environment, rather than requiring different backup configurations for different types of storage. Additionally, it permits utilization of snapshots per individual virtual machine, as compared to volume level snapshots which were required in traditional configurations. This affords faster snapshots and frees up resources on other hosts. Moreover, as data is sent to the remote server as a stream rather than a file, is a necessary to maintain change of parent-child disks on the server. This further simplifies the backup and recovery process.

While the foregoing has been with respect to particular embodiments of the invention, it will be appreciated by those skilled in the art the changes to these embodiments may be made without departing from the principles and the spirit of the invention, the scope of which is defined by the appended claims.

The invention claimed is:

1. A method of unified backup for different hypervisor configurations of a plurality of virtual machines of a cluster sharing different storage architectures and having a plurality of hosts, the method, comprising:

identifying all said virtual machines of said cluster, and selecting ones of said identified virtual machines as virtual machine targets for backup;

gathering, by a primary host of said plurality of hosts, properties of said selected virtual machine targets;

accessing said selected virtual machine targets and creating individual virtual machine-level checkpoints for each of said selected virtual machine targets;

identifying cluster hosts for a backup rollover of the selected virtual machine targets, and balancing the backup data load of said selected virtual machine targets among said identified cluster hosts, each identified cluster host acting as an open point from where said back rollover of a corresponding selected virtual machine target is initiated;

backing up data of said selected virtual machine targets in parallel using said identified cluster hosts by transferring the data to a backup server as a data stream for a full backup of a selected virtual machine target and transferring data changed from a previous backup of another virtual machine target to said backup server for an incremental backup, said transferring comprising transferring information with said transferred data as to where the transferred data is to be merged with previously backed up data; and creating a reference point for said backed up data for tracking data changes following said backing up.

2. The method of claim 1 further comprising validating said data backup and creating a snap-view of metadata of the backup process for performing recovery or a next incremental backup of the virtual machine target.

3. The method of claim 1, wherein said accessing comprises querying said virtual machine targets to gather virtual machine data points for virtual machine targets that span said hosts.

4. The method of claim 3, wherein said accessing comprises accessing in parallel virtual machine targets having cluster shared column storage and having server message block storage.

5. The method of claim 1, wherein said creating individual machine-level checkpoints comprises creating a machine-level snapshot of all selected virtual machine targets.

6. The method of claim 5, wherein said creating snapshots comprises creating snapshots of individual virtual machine targets and not creating snapshots of storage volumes.

7. The method of claim 1, wherein said backing up comprises sending a copy of underlying disks of a selected virtual machine target for a full back up of said selected virtual machine target as a data stream to said backup server.

8. The method of claim 7, wherein said sending comprises streaming copies of said underlying disks in parallel to the backup server.

9. The method of claim 1, wherein said transferring information as to where transferred data is to be merged comprises sending, for an incremental backup, metadata identifying extent locations, lengths and offsets on a backup server of chunks of data that changed since the last backup, and streaming to the backup server the changes to said chunks of data for merging with the previously stored data.

10. The method of claim 1, wherein creating a reference point comprises using a checkpoint created for a virtual machine target and a resilient change tracking identifier that identifies the virtual machine target and tracks changes to a target subsequent to backup.

11. A non-transitory computer readable medium for storing executable instructions for controlling the operations of a processor to perform a method of unified backup of different hypervisor configurations of a plurality of virtual machines of a cluster sharing different storage architectures and having a plurality of hosts, comprising:

identifying all said virtual machines of said cluster, and selecting ones of said identified virtual machines as virtual machine targets for backup;

gathering, by a primary host of said plurality of hosts, properties of said selected virtual machine targets;

accessing said selected virtual machine targets and creating individual virtual machine-level checkpoints for each of said selected virtual machine targets;

identifying cluster hosts for a backup rollover of the selected virtual machine targets, and balancing the backup data load of said selected virtual machine targets among said identified cluster hosts, each identified cluster host acting as an open point from where said back rollover of a corresponding selected virtual machine target is initiated;

backing up data of said selected virtual machine targets in parallel using said identified cluster hosts by transferring the data to a backup server as a data stream for a full backup of a selected virtual machine target and transferring data changed from a previous backup of another virtual machine target to said backup server for an incremental backup, said transferring comprising transferring information with said transferred data as to where the transferred data is to be merged with previously backed up data; and creating a reference point for said backed up data for tracking data changes following said backing up.

12. The non-transitory computer readable medium of claim 11 further comprising validating said data backup and creating a snap-view of metadata of the backup process for performing recovery or a next incremental backup of the virtual machine target.

13. The non-transitory computer readable medium of claim 11, wherein said accessing comprises querying said virtual machine targets to gather virtual machine data points for virtual machines that span said hosts.

14. The non-transitory computer readable medium of claim 13, wherein said accessing comprises accessing in parallel virtual machine targets having cluster shared column storage and having server message block storage.

15. The non-transitory computer readable medium of claim 11, wherein said creating individual machine-level checkpoints comprises creating a machine-level snapshot of all selected virtual machine targets.

16. The non-transitory computer readable medium of claim 15, wherein said creating snapshots comprises creating snapshots of individual virtual machine targets and not creating snapshots of storage volumes.

17. The non-transitory computer readable medium of claim 11, wherein said backing up comprises sending a copy of underlying disks of a selected virtual machine target for a full back up of said selected virtual machine target as a data stream to said backup server.

18. The non-transitory computer readable medium of claim 17, wherein said sending comprises streaming copies of said underlying disks in parallel to the backup server.

19. The non-transitory computer readable medium of claim 11, wherein said transferring information as to where transferred data is to be merged comprises sending, for an incremental backup, metadata identifying extent locations, lengths and offsets on a backup server of chunks of data that changed since the last backup, and streaming to the backup server the changes to said chunks of data for merging with the previously stored data.

20. The non-transitory computer readable medium of claim 11, wherein creating a reference point comprises using a checkpoint created for a virtual machine target and a resilient change tracking identifier that identifies the virtual machine target and tracks changes to a target subsequent to backup.

* * * * *